No. 613,255. Patented Nov. 1, 1898.
W. H. DOUGHERTY.
ROTARY MOTOR.
(Application filed Oct. 4, 1897.)
(No Model.) 2 Sheets—Sheet 1.

WITNESSES:
INVENTOR
William H. Dougherty
BY
Garry P. Van Wyc.
ATTORNEY

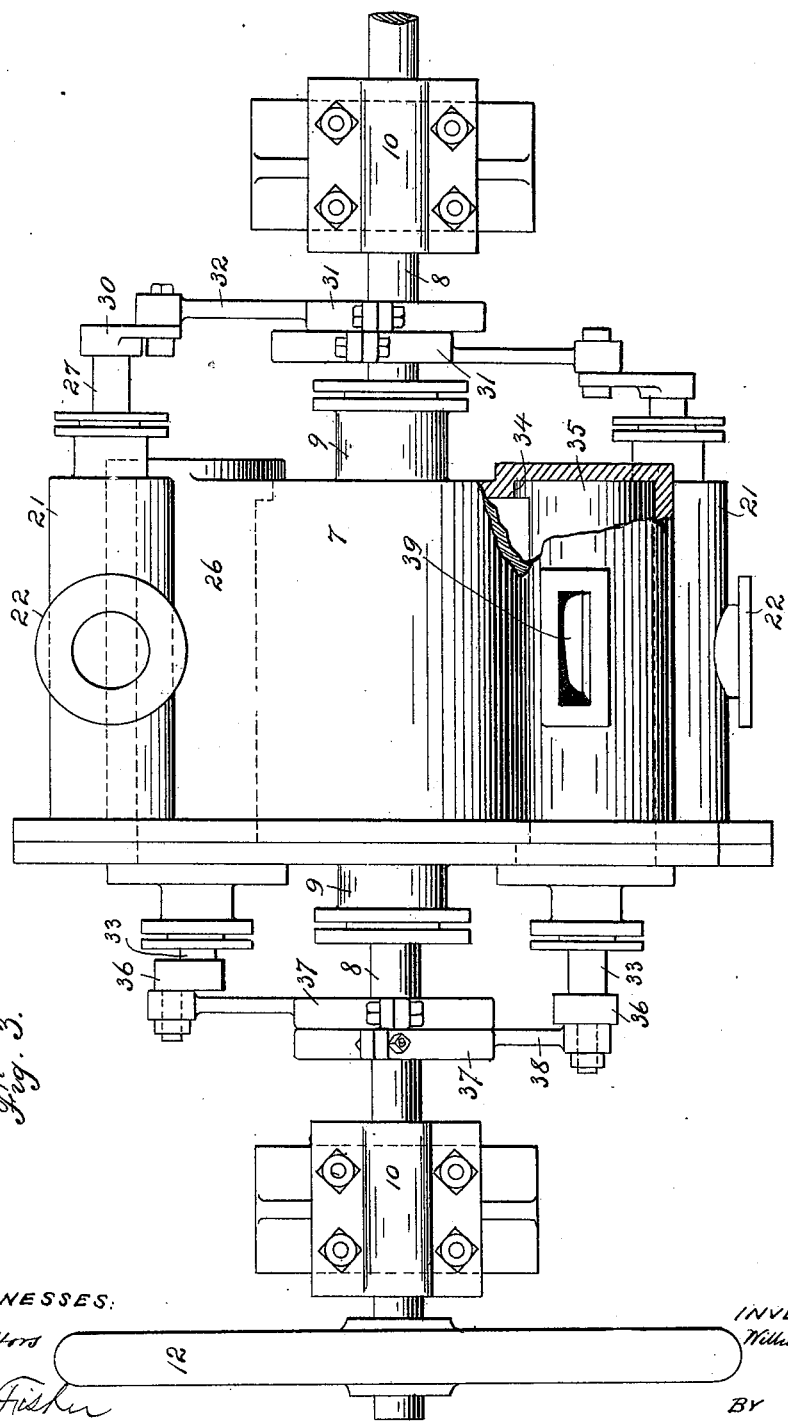

UNITED STATES PATENT OFFICE.

WILLIAM H. DOUGHERTY, OF NEW YORK, N. Y.

ROTARY MOTOR.

SPECIFICATION forming part of Letters Patent No. 613,255, dated November 1, 1898.

Application filed October 4, 1897. Serial No. 653,951. (No model.)

*To all whom it may concern:*

Be it known that I, WILLIAM H. DOUGHERTY, a citizen of the United States, residing at New York, in the county of New York and State of New York, have invented certain new and useful Improvements in Rotary Motors, of which the following is a full and complete specification, such as will enable those skilled in the art to which it appertains to make and use the same.

This invention relates to rotary motors, and the object thereof is to provide means for the admission of steam to the said motor and to direct the same against the blades of the revolving piston in the direction of revolution. I attain these objects by the mechanism illustrated in the accompanying drawings, in which—

Figure 1:
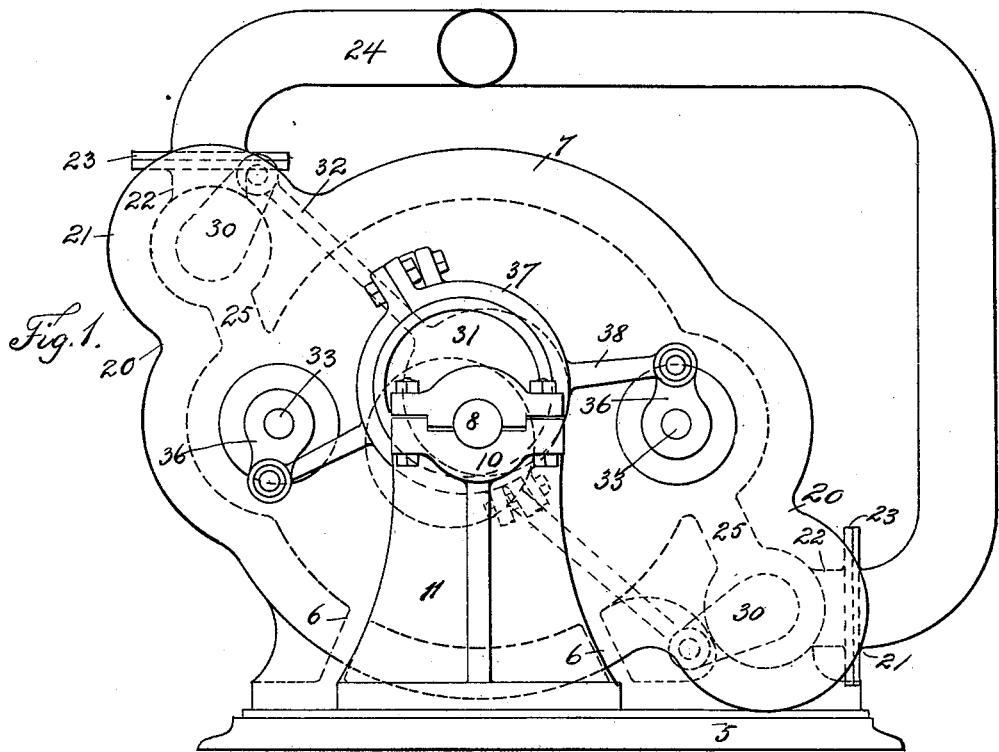
Figure 2:
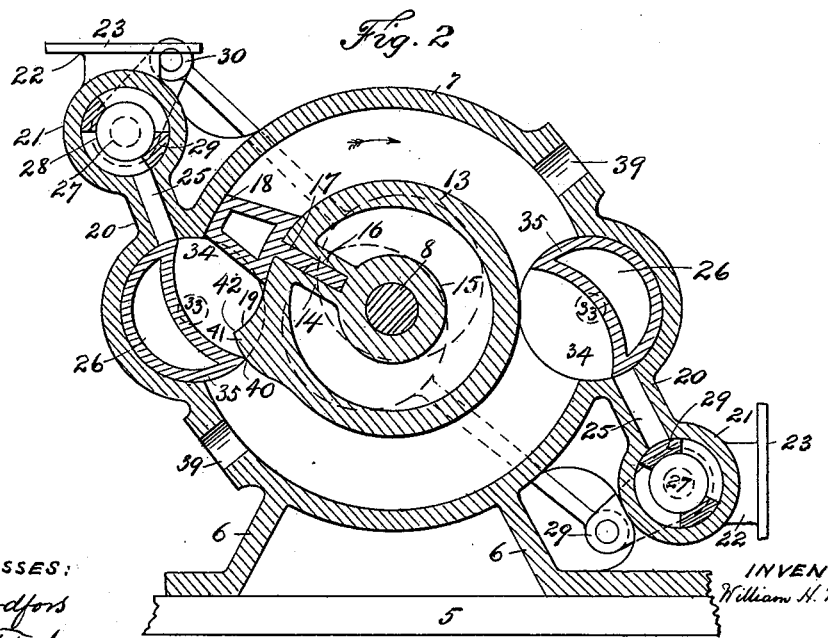

Figure 1 is an elevation of the end of a motor with my improvement connected therewith; Fig. 2, a vertical section thereof; and Fig. 3, a plan view thereof, partly in section.

Like numerals of reference refer to like parts throughout the several views, and in the practice of my invention I provide a base-plate 5, to which is secured upwardly-directed standards 6, on which is formed a cylindrical casing 7, which forms the casing of a rotary motor. Mounted centrally and longitudinally of said casing 7 is a shaft 8, which passes through suitable packing-boxes 9 at the ends of the casing 7 and is journaled in bearings 10 on standards 11 at each end of the base 5, and one end of the shaft is provided with a fly-wheel 12, and the opposite end may be connected with any machinery which it is desired to operate.

Mounted on the shaft 8, within the cylindrical casing 7, is a second cylindrical casing 13, having an inwardly-directed spoke 14, on which is formed a tubular hub 15, which is secured to said shaft 8 and is revoluble therewith, and the said casing 13 and spoke 14 are provided with a longitudinal slot 16, in which is mounted the reduced extension 17 of a blade 18, it being understood that any number of these blades may be radially mounted upon the casing 13, and on the outer surface of the casing 13 is a longitudinal shoulder 19, which is of the shape shown in Fig. 2, in cross-section, the outer or rear part being convex, as indicated at 41, and the forward part being concave, whereby a sharp edge 42 is formed, and the blade 18 is mounted adjacent to said shoulder 19, whereby a longitudinal recess or groove is formed between said blade and shoulder, one wall of which is concave in cross-section, so that the full force of the steam is directed against the entire surface of the blade as soon as admitted, as will be readily understood.

The casing 7 is provided at different points thereof with a longitudinal boss 20, having a tubular head 21, two of which are shown in the drawings, but any number of which may be used, and the tubular head 21 is provided with a short tube 22, having a head 23, to which is connected a steam-pipe 24, and the tubular head 21 is in communication with the interior of the casing 7 through a passage 25, and the casing 7 is provided with a semicylindrical chamber 26 at the inner end of said passage 25, which is formed in the inner wall of said casing, as clearly shown in Fig. 2.

Mounted in the head 21 of the boss 20 is a short shaft 27, to the inner end of which is secured a collar 28, with which is connected a cut-off valve 29, and to the outer end of the shaft 27 is secured an arm 30, which is connected with an eccentric 31 by a rod 32, by means of which the said shaft 27 and cut-off valve 29 is reciprocated, as will be readily understood.

In the end of the chamber 26 is mounted a short shaft 33, with which is connected, by means of a collar 34, an abutment 35, which is crescent-shaped in cross-section and the convex surface of which fits closely in the said semicylindrical chamber 26, as clearly shown in Fig. 2, and to the outer end of the shaft 33 is connected an arm 36, which is connected with an eccentric 37 by a rod 38 and by means of which said abutment is reciprocated, as will be readily understood. The casing 7 is provided adjacent to said semicylindrical chamber 26 with an exhaust-port 39, and the operation will be readily understood from the foregoing description when taken in connection with the accompanying drawings and the following statement thereof.

The cylinder 13 and blade 18 connected therewith revolve in the direction of the arrow shown in Fig. 2, but may revolve in the opposite direction, if desired, and in Fig. 2 the steam-pipe 24 is in communication with the interior of the casing 7 through the head 21, the valve 29, and passage 25 at the left of said figure, while the passage 25 at the right is closed by the corresponding valve 29, as will be readily observed. The abutment 35 and the cut-off valve 29 are oscillated once during a complete revolution of the cylinder 13, and as the eccentrics 37 and 31 are both mounted upon the same shaft 8 it is evident that the cut-off valve and abutment will be revolved synchronously. When the cut-off valve is operated, so that the passage 25 is open, as shown at the left of Fig. 2, steam will pass inwardly through said passage, and at the same time the inner end of the passage 25 is open by the corresponding abutment 35 and steam is admitted to the interior of the casing 7, as will be readily understood. The oscillation of the cut-off valve and said abutment is so timed that the sharp edge 40 of the abutment 35 will come in contact with the curved surface 41 of the shoulder 19 of the casing 13 immediately after the sharp edge 42 of the said shoulder has passed the same, and the sharp edge 40 will continue in contact with the inwardly-curved surface 41 of the shoulder 19 by reason of the oscillation of said abutment until the said sharp edge 40 rests upon the outer surface of the cylindrical casing 13, with which it continues in contact until the blade 18 passes the exhaust-port 39, and by reason of this construction the steam is directed forwardly in the direction of rotation and is cut off from flowing back, as will be readily understood, until the same has been exhausted through the exhaust-port 39, it being understood that any suitable means may be provided to open the said exhaust-ports after the passage of the blade 18, if not desired to keep them normally open.

I do not confine myself to the exact arrangement and construction here set forth, but reserve the right to make all alterations which fairly come within the scope of my invention, and it will also be understood that I may mount any number of motors upon the same shaft and operate the same by means of this mechanism, each receiving the steam independently of the other, and also that when so mounted the said motors may be compounded, the steam from one being exhausted into another, as will be clearly understood.

Having fully described my invention, what I claim, and desire to secure by Letters Patent, is—

1. In a rotary motor, a revolving cylinder or piston provided on the outer surface thereof with a longitudinal shoulder, the forward part of which is concave in cross-section and the rear part convex in cross-section; a blade mounted on said cylinder adjacent to said shoulder; a crescent-shaped abutment suitably mounted in the wall of the casing; and means to bring one edge of said abutment in contact with the convex surface of said shoulder, and hold the same in contact therewith and with the outer surface of said cylinder, substantially as and for the purpose described.

2. In a rotary motor, a revoluble cylinder provided with a blade; a shoulder formed on said cylinder adjacent to said blade, the surface thereof adjacent to the blade being concave in cross-section, and the opposite surface being convex in cross-section whereby a sharp edge is formed; and an oscillating abutment adapted to direct the steam against said blade, and to engage the convex surface of said shoulder and the outer surface of said cylinder, substantially as and for the purpose set forth.

3. In a rotary motor, a revoluble cylinder provided with a blade; a shoulder on said cylinder adjacent to said blade, the surface thereof adjacent to the blade being concave in cross-section, and the opposite surface being convex in cross-section whereby a sharp edge is formed; and an oscillating abutment adapted to direct the steam against said blade, and to engage the convex surface of said shoulder and the outer surface of said cylinder, the said abutment being crescent-shaped in cross-section, and being oscillated across the communicating steam-passage by means of an eccentric mounted upon the main shaft of the motor, and being so regulated that one edge of said abutment will contact with the convex surface of said shoulder adjacent to the sharp edge thereof, and by the further movement of the said eccentric a continuous contact being formed between the sharp edge of the abutment and the said convex surface of the shoulder and the outer surface of the cylinder throughout a portion of the revolution thereof, substantially as and for the purpose described.

4. In a rotary motor, the herein-described means for controlling the passage of steam into the same and against the blade of the revolving cylinder, comprising a cut-off valve connected with an eccentric mounted upon the main shaft; an abutment mounted at the inner end of the steam-passage, and connected with a second eccentric mounted on the main shaft by which it is oscillated across the said steam-passage; a revoluble cylinder provided with a blade; a shoulder on said cylinder adjacent to said blade, and having the forward part thereof concave in cross-section and the rear part convex in cross-section whereby the entire force of the steam is directed against the entire surface of said blade as soon as admitted; said abutment being crescent-shaped in cross-section, and so constructed and regulated that one edge thereof will engage the convex surface of said shoulder adjacent to the sharp edge thereof, and continue in contact with the said convex surface, and also with the outer surface of the said cylinder after the passage of the shoulder, substantially as and for the purpose described.

In testimony that I claim the foregoing as my invention I have signed my name, in presence of the subscribing witnesses, this 1st day of October, 1897.

WILLIAM H. DOUGHERTY.

Witnesses:
 C. GERST,
 A. C. VAN BLARCOM.